United States Patent Office 3,544,640
Patented Dec. 1, 1970

3,544,640
AROMATIC NITRO COMPOUNDS
Milton B. Frankel, Tarzana, and Gerald L. Rowley, Van Nuys, Calif., assignors to North American Rockwell Corporation, a corporation of Delaware
No Drawing. Filed Mar. 10, 1967, Ser. No. 623,183
Int. Cl. C07c 79/10, 79/12
U.S. Cl. 260—645      6 Claims

ABSTRACT OF THE DISCLOSURE

Compounds comprising aromatic, substituted aromatic, heterocyclic, and substituted heterocyclic halodinitromethyl compounds and their syntheses. The method comprises reacting monohalomethyl aromatic or heterocyclic compounds with nitrile salts of Group I–A and I–B metals, thereby substituting a nitrite group for a halogen. This aromatic nitro compound is then halogenated, producing monohalonitromethyl aromatic or heterocyclic compounds which are then reacted with nitrite salts of Groups I–A and I–B metals to give the corresponding salts of the dinitromethyl compounds. A final halogenation or acidification produces halodinitromethyl or dinitromethyl, etc., aromatic or heterocyclic compounds.

BACKGROUND OF THE INVENTION

At present, there is no ideal all-purpose high explosive. Rather, some high explosives approach the ideal in a given application. For instance, trinitrotoluene, TNT, is inexpensive to manufacture and is not highly impact sensitive. On the other hand, 1,3,5 - trinitrazacyclohexane, RDX, is more powerful than TNT, generally an advantage, but is also more impact sensitive, generally a disadvantage. It can be seen that for some applications, TNT would be a suitable explosive. For others, RDX would be preferable. In some applications, a dense high explosive is desirable. It is an object of this invention to provide a method for producing a family of dense energetic high explosives.

Previously, it has been shown in the art that conventional explosives containing fluorine atoms exhibit physical and explosive properties which are superior to those of the parent nonfluorinated explosives. One such parent compound is dinitromethyl benzene. It is an object of this invention to provide methods for the synthesis of polyfluoro dinitromethyl aromatic, polyfluoro dinitromethyl substituted aromatic, polyfluoro dinitromethyl heterocyclic and polyfluoro dinitromethyl substituted heterocyclic compounds.

In general, the explosive power of an aromatic compound is increased as more energetic groups are substituted on the aromatic ring. Examples of energetic groups are $NO_2$, $C(NO_2)_2H$, and $C(NO_2)_2F$. For example, 1,4-bis(dinitromethyl)benzene would be a more powerful explosive than dinitromethyl benzene. It is on additional object of this invention to increase the explosive properties of aromatic, substituted aromatic, heterocyclic, and substituted heterocyclic compounds.

The foregoing and other objects of the invention will become apparent from the following detailed description.

SUMMARY OF THE INVENTION

The process of the instant invention comprises four steps. They can be summarized:

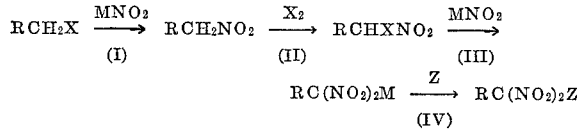

where R is a radical selected from the group consisting of aromatic, substituted aromatic, heterocyclic, and substituted heterocyclic radicals containing from 3 to 12 carbon atoms; where M is a Group I–A or I–B metal; where X is an element selected from the group consisting of F, Cl, Br, and I; and where Z is an element selected from the group consisting of F, Cl, Br, I, and H.

The four-step process of the instant invention comprises a first step of reacting a nitrite salt of a Group I–A or I–B metal with a compound selected from the group consisting of monohalomethyl substituted and unsubstituted aromatics, monohalomethyl substituted and unsubstituted heterocyclic compounds containing from 3 to 12 carbon atoms such that a mononitromethyl compound is formed; a second step of reacting said mononitromethyl compound with a compound selected from the group consisting of fluorine, chlorine, bromine, and iodine such that a monohalonitromethyl compound is formed; a third step of reacting said monohalonitromethyl compound with a nitrite salt of a Group I–A or I–B metal such that a salt of the dinitromethyl compound is formed; and a fourth step of reacting said dinitromethyl salt with a compound selected from the group consisting of fluorine, chlorine, bromine, iodine, and hydrogen such that a halodinitromethyl or dinitromethyl cmopound is formed.

It will be noted that both the first and third steps comprise the reaction of an organic compound with a nitrite salt of a Group I–A or I–B metal. Similarly, the second and fourth steps are identical, except that the fourth step can also involve the conversion of the salt of the dinitromethyl compound to the free dinitromethyl compound.

The compounds formed at the completion of each of the four steps can be of a novel class. This novel class is described by the general formula:

$$R—(A)_y$$

where:

R is a radical selected from the group consisting of aromatic, substituted aromatic, heterocyclic, and substituted heterocyclic radicals containing from 3 to 12 carbon atoms;

A is a radical selected from the group consisting of $CH_2NO_2$;

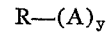

where X is an ion selected from the group consisting of F, Cl, Br, and I;

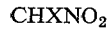

where M is a Group I–A or I–B metal;

where Z is an ion selected from the group consisting of F, Cl, Br, I, and H; and y is an integer of from 2 to 6.

DESCRIPTION OF THE PREFERRED EMBODIMENTS

It can be seen that the process of the invention is a four-step synthesis. The first step is the replacement of the halogen atom in a halomethyl compound by a nitrite ion. It is depicted by the following equation:

(I)      $RCH_2X + MNO_2 \rightarrow RCH_2NO_2 + MX$ where R is as before; M is as before; and X is as before.

If the R compounds are substituted by more than one $CH_2X$ group, then polynitromethyl compounds will be formed. The aromatic R radical is phenyl. Examples of substituted aromatic R radicals are nitrophenyl, polynitro phenyl, halomethyl phenyl, nitrohalomethyl phenyl, halo halomethyl phenyl, polyhalomethyl phenyl, and polynitro polyhalomethyl phenyl. Examples of heterocyclic R radicals are pyridyl, triazyl, and furyl. Examples of substituted heterocyclic R compounds are nitrotriazyl, halomethyl pyridyl, nitro halomethyl/pyridyl, halo halomethyl triazyl, nitrohalomethyl triazyl, polyhalomethyl furyl, and polynitro polyhalomethyl triazyl.

It should be understood that the substituted aromatic or substituted heterocyclic compound could be substituted with one or more monohalomethyl groups, in which case Reaction I would also take place on the substituted monohalomethyl group or groups. An example of this multiple substitution reaction is depicted in Reaction Ia:

(Ia)
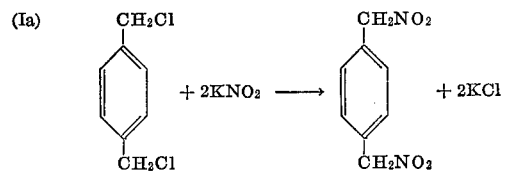

here, the compound para-bis(chloromethyl)benzene is converted into the novel compound para-bis(nitromethyl)benzene. When a multiple substitution reaction occurs, as exemplified by Reaction Ia, the new compounds formed by Reaction I are novel. Examples of such polysubstituted compounds are ortho-, meta-, para-bis(halomethyl)benzene and tris(halomethyl)benzene. In the case of the novel compound para(nitromethyl)benzene shown in Ia, the starting R of Reaction I would be a benzene ring with a para substituted chloromethyl group. The (CH$_2$X) of Reaction I would be the remaining chloromethyl group. Reaction I would then convert both chloromethyl groups to nitromethyl groups, producing a novel compound. Further examples of R's that are substituted by halomethyl groups are 1,4-bis(chloromethyl)benzyl, 1-(bromomethyl)aziridyl, 2-fluoro, 3-fluoromethyl s-triazyl, and tris-fluoromethyl phenyl. Aromatic, substituted aromatic, heterocyclic, and substituted heterocyclic compounds with more than one CH$_2$NO$_2$ group attached to the ring are not known in the prior art. A generic description of these novel compounds would be $$R(CH_2NO_2)_y$$

where R is a radical containing from 3 to 12 carbon atoms selected from the group consisting of aromatic, substituted aromatic, heterocyclic, and substituted heterocyclic radicals, and y is an integer of from 2 to 6.

In Reaction I the monohalo compound is converted to the mononitro compound by a nitrite salt of a Group I–A metal, such as lithium nitrite, sodium nitrite, potassium nitride, etc., or of a I–B metal, such as copper nitrite, silver nitrite.

Reaction I should be conducted at depressed temperatures, or an excessive amount of undesirable side products will be formed. Temperatures between −30° C. and +10° C. are preferred. The reaction is conducted in a suitable solvent, for example with NaNO$_2$, dimethyl, formamide and dimethyl, sulfoxides are the solvents of choice whereas with silver nitrite best results are obtained with ether or methylene chloride as solvents. Good stirring is essential because of the heterogeneous nature of the reaction. After reaction, the side product MX can be extracted according to means known in the art.

EXAMPLES OF REACTIONS I

Synthesis of 1,4-bis(nitromethyl)benzene (A) With sodium nitrite. Over a period of 30 minutes of 52.8 gm. 1,4-bis(bromoethyl)benzene dissolved in 200 ml. of warm dimethylformamide was added in small portions to a stirred solution of 48.0 gm. sodium nitrite and 5.32 gm. of urea in 600 ml. of dimethylformamide cooled to −35° C. After 4.5 hours stirring with the temperature maintained between −20 and −25° C., the orange solution was poured over 750 gm. ice, 250 ml. water, and 100 ml. methylene chloride. The methylene chloride solution was separated and the remaining aqueous phase was extracted with four 100 ml. portions of methylene chloride. After the pooled extracts and methylene chloride solution was dried over anhydrous sodium sulfate, the solvent was removed under reduced pressure leaving 42.5 gm. of yellow oily solid. Two recrystallizations from 1,2-dichloroethane, washing the solid with cold benzene between crystallizations, yielded 3.84 gm. white plates, M.P. 129.5–130.5° C. Recrystallization from 1,2-dichloroethane yielded the analytical sample: M.P. 130.5–132° C. $\lambda_{Nujol\ max.}$ 6.5$\mu$, 7.3$\mu$.

Analysis.—Calcd. for C$_8$H–N$_2$O$_4$ (percent): C, 48.98; H, 4.11; N, 14.28. Found (percent): C, 48.54; 48.40; H, 3.91; 3.96; N, 14.35.

(B) With silver nitrite.—Over a period of 1 hour 66.0 gm. of 1,4-bis(bromoethyl)benzene dissolved in 750 ml. of warm methylene chloride was added in small portions to a stirred slurry of 100 gm. of silver nitrite, 150 ml. of methylene chloride cooled to 0° C. A small soxlet thimble sealed with 1.0 gm. of calcium hydride was added. After the mixture was stirred in the dark for 17 hours at 0° C., the solids were filtered and washed with methylene chloride. The solvent was removed under reduced pressure leaving 48.9 gm. of pale yellow oily solid. Over a period of 15 min. the solid was added in small portions to 100 ml. of concentrated sulfuric acid stirred at −5° C.

The mixture evolved nitrogen oxides and became black. After the final addition the mixture was stirred for 15 min. then poured over 500 gm. of ice. After the ice had melted, the brown solid was filtered, washed six times with copious amounts of water and dried in vacuo to give 32.9 gm. The solid was digested in boiling 1,2-dichloroethane, charcoal added, filtered hot, and allowed to crystallize on cooling to yield 12.5 gm. pale yellow plates, M.P. 128–130.5° C. The infrared spectrum of this product was identical to the previously prepared 1,4-bis(nitromethyl) benzene. The cold concentrated sulfuric acid was used to hydrolyze and remove nitrite esters, thus improving the yield of nitro compound.

The second step in the novel synthesis of the instant invention is the reaction:

(II) $\quad RCH_2NO_2 + X_2 \rightarrow RCHXNO_2 + HX$ where X and R are as before.

If R is a substituted aromatic or substituted heterocyclic compound substituted with more than one (CH$_2$NO$_2$) group, as previously described, the compound resulting from Reaction II is novel. The novel compound can be generically described as R(CHXNO$_2$)$_y$ where R is a radical containing from 3 to 12 carbon atoms selected from the group consisting of aromatic, substituted aromatic, heterocyclic, and substituted heterocyclic radicals; y is an integer of from 2 to 6, and X is a compound selected from the group consisting of chlorine, bromine, iodine, and fluorine. Examples of such novel polysubstituted compounds are 1,4-bis(fluoronitromethyl)benzene; 1,3-bis(bromonitromethyl)-2,4,6- trinitro benzene; 2,4,6 tris(chloronitromethyl)-s-triazine, and 2,3-bis(fluoronitromethyl)pyridine.

Reaction II should also be conducted at reduced temperatures. Temperatures between −10° C. and +30° C. are preferred. It is preferred that Reaction II be conducted in a medium of relatively high pH, say between 3 and 12. A basic medium causes the salt of the nitro compound to precipitate from an organic solvent. The salt can then be reacted with a halide, producing the halonitro compound, which can be separated by means known in the art. This reaction can be depicted:

(IIa)
$$RCH_2NO_2 + MOH \longrightarrow RCHNO_2M \xrightarrow{X_2} RCHNO_2X + MX$$

where R, X, and M are as previously defined.

EXAMPLES OF REACTION II 1,4-bis(bromonitromethyl)benzene

A stirred suspension of 1.42 gms. of 1,4-bis(dinitromethyl)benzene in 75 ml. methanol at 0° C. was treated with 150 ml. of methanolic potassium hydroxide. The pale yellow precipitated dipotassium salt was dissolved by the addition of 75 ml. of water. This solution was chilled to 0° C., and 75 ml. of methanolic bromine were added dropwise simultaneously to 300 ml. of water stirred at 0° C. A white precipitate appeared immediately. An excess of bromine was maintained at all times and the temperature was maintained at or somewhat below 0° C. Stirring was continued for an additional 15 min. at 0° C., followed by pouring the mixture into 1000 ml. water. The solid was filtered, washed with three 200 ml. portions of water, dissolved in warm methylene chloride and separated from the aqueous phase. After the methylene chlorine solution was dried over anhydrous sodium sulfate, the solvent was removed under reduced pressure. The resulting solid was dissolved in hot carbon tetrachloride, separated from a small amount of insoluble organic solid and cooled to yield 22.33 gm. of pale yellow needles, M.P. 121–123.5° C. Alternatively, in another preparation, the filtered white solid was dried in vacuo before crystallizing from carbon tetrachloride. Recrystallization from carbon tetrachloride yielded the analytical sample: M.P. 123.5–125° C. $\lambda_{\text{Nujol max.}}$ 6.4 $\mu$, 7.5$\mu$.

*Analysis.*—Calcd. for $C_8H_6Br_2N_2O_4$ (percent): C, 27.14; H, 1.71; N, 7.92. Found, (percent): C, 26.89, 27.00; H, 2.07, 1.84; N, 7.97.

The third step in the novel process of the instant invention is the substitution of the remaining halide with yet another nitro group. The equation of the reaction is:

(III)  $RCHXNO_2 + MNO_2 \rightarrow RC(NO_2)_2M + HX$ where X, M, and R are as before.

R can be a substituted aromatic, or substituted heterocyclic compound, substituted with one or more $CHXNO_2$ groups. If this is the case, novel compounds are formed by Reaction III. These new compounds are generically described by the formula $R-[C(NO_2)_2M]_y$ where R is a radical containing from 3 to 12 carbon atoms selected from the group consisting of aromatic, substituted aromatic, heterocyclic and substituted heterocyclic radicals; y is an integer of from 2 and 6; and M is a group I–A or I–B.

This reaction can be conducted at ambient temperatures. However, the reaction is exothermic, so care should be taken that the temperature of the reaction mixture does not rise excessively. Generally, the reaction temperature should be kept below about 40° C.

EXAMPLE OF REACTION III

Synethsis of dipotassium 1,4-bis(dinitromethyl)benzene

A solution of 1.77 gm. of 1,4-bis(bromonitromethyl)benzene in 35 ml. of methanol was poured into a stirred solution prepared by dissolving 2.04 gm. of potassium nitrite in 4 ml. of water and adding 15 ml. of methanol. An orange precipitate appeared in 30 sec. from the initial orange solution and the temperature rose rapidly from 26° C. to 30° C. Stirring was continued for 1 hour during which time the temperature slowly fell to 26° C. The solid was filtered, washed with two 10 ml. portions of methanol, and dried in vacuo to give 1.06 gm. of crude dipotassium 1,4-bis(dinitromethyl)benzene. The salt was purified by dissolving in 70 ml. of water, filtering out insoluble solid, employing filter aid, concentrating the resulting solution to 2.5 ml. under reduced pressure, adding 5 ml. of methanol and filtering the resultant 0.80 gm. of bright yellow solid.

This salt is not as shock sensitive as similar aliphatic potassium nitro-nitronate salts. It could not be detonated by shock but could be detonated by plunging into a 200° C. oil bath. However, no melting point or explosion point was observed when a sample was heated slowly to 360° C.

The fourth step in the synthesis is the removal of the metal ion and the substitution therefor by a compound selected from the group consisting of hydrogen, fluorine, chlorine, bromine, and iodine. It should be noted that only positive species should replace the metal. It is well known in the art that halide atoms exist as positive species, as the product of a heterolytic splitting of the naturally-occuring diatomic molecule. While not wishing to be bound by theory, it is felt that it is this positive species that replaces the metal. The reaction is described by the following equation:

(IV)  $RC(NO_2)_2M + Z^+ \rightarrow RC(NO_2)_2Z + M^+$ where M and R are as before and Z is an ion selected from the group consisting of chlorine, bromine, fluorine, iodine, and hydrogen.

Again, R can be a substituted aromatic or substituted heterocyclic compound substituted by one or more $-C(NO_2)_2$ groups. If this is the case, a class of new compounds is formed. This class is generically described by the formula $R-[C(NO_2)_2Z]_y$ where R is a radical selected from the group consisting of aromatic, substituted aromatic, heterocyclic, and substituted heterocyclic radicals containing from 3 to 12 carbon atoms; y is an integer between 2 and 6; and Z is a compound selected from the group consisting of fluorine, chlorine, bromine, iodine, and hydrogen.

Hydrogen ions are suitably furnished by mineral acids such as nitro, sulfuric, and hydrochloric. Halogen ions are suitably furnished by the pure halogen, solvated in, for instance, methyl alcohol. The halogen may also be solvated in ether, methyl chloride and water. As in Recation II, if the halo compound is desired, the reaction should be in a basic medium. If the free compound is desired, an acidic medium is preferred.

The ions added are present in aqueous solution, the exception being fluorine ions. If an aqueous solution were to be used for fluorine, the fluorine would react with the water, producing hydrogen fluorine, which would react with the nitromethyl salt to give the free compound. The desired fluorination can be effected by carrying out the fluorination at −10 to +10° C. in a non-aqueous medium utilizing solvents such as acetonitrile and dimethylformamide in which the salt has some solubility. For the production of the other halocompounds or the free compound, temperatures between 0° C. and 10° C. are preferred.

EXAMPLES OF REACTION IV 1,4-bis(dinitromethyl)benzene

A 5 ml. aqueous solution of 0.6 ml. of concentrated hydrochloric acid was added dropwise to a stirred 70 ml. aqueous solution of 0.39 gm. of dipotassium 1,4-bis(dinitromethyl)benzene at 0° C. The yellow-orange color of the solution faded as a pale yellow solid precipitated. The solid was filtered, washed with two 5 ml. portions of water, and dried in vacuo to yield 0.30 gm., M.P. 122–122.5° decomposed. Crystallization from chloroform followed by recrystallization from 1,2-dichloroethane yielded the analytical sample: M.P. 127.5–128 decomp. $\lambda_{\text{Nujol max.}}$ 6.3$\mu$.

*Analysis.*—Calcd. for $C_8H_6N_4O_8$ (percent): C, 33.57; H, 2.11; N, 19.58. Found (percent): C, 33.24; 33.23, 33.54; H, 2.55, 2.41, 2.54; N, 19.54.

1,4-bis(bromodinitromethyl)benzene 5 ml. of a 0.53 gm. methanolic bromine solution was slowly poured into a stirred 70 ml. aqueous solution of 0.41 gm. dipotassium 1,4-bis(dinitromethyl)benzene at 0° C. The yellow-orange color of the solution faded as a white solid precipitated. The solid was filtered, washed with two 5 ml. portions of water, and dried in vacuo to yield 0.50 gm., M.P. 125–127° decomposed. Two recrystallizations from carbon tetrachloride yielded the analytical sample: M.P. 130–131° decomp. $\lambda_{\text{Nujol max.}}$ 6.3$\mu$.

*Analysis.*—Calcd. for $C_8H_4Br_2O_8$ (percent): C, 21.64; H, 0.91; N, 12.62. Found (percent): C, 21.83, 21.77; H, 0.71, 0.89; N, 12.50.

1,4-bis(fluorodinitromethyl)benzene

A slurry of 0.2 g. of the dipotassium salt of 1,4-bis(dinitromethyl)benzene and 15 ml. of acetonitrile was cooled to −8° C. and purged with dry nitrogen. Then, a 3:1 $N_2/F_2$ gas mixture was bubbled through the reaction mixture at a rate of 60 cc./min. for 30 min. The mixture was purged with nitrogen, allowed to warm to ambient temperature, and filtered free of the precipitated potassium fluoride. Concentration in vacuo of the filtrate gave 0.17 g. (quantitative yield) of yellow solid. Recrystallization from isopropyl alcohol gave colorless plates, M.P. 86–88° C.

*Analysis.*—Calcd. for $C_8H_4F_2N_4O_8$ (percent): C, 29.80; H, 1.24; N, 17.40. Found (percent): C, 29.86, 30.02; H, 1.26, 1.26; N, 17.44.

Since it is obvious that many changes and modifications can be made in the above-described details of the process without departing from the nature and spirit of the invention, it is to be understood that the invention is not to be limited thereto except as set forth in the appended claims.

We claim:

1. The compound

wherein R is a member selected from the group consisting of $CHXNO_2$, $C(NO_2)_2M$ and $C(NO_2)_2Z$, wherein X is an ion selected from the group consisting of F, Cl, Br and I, wherein M is a Group I–A or I–B metal, wherein Z is a member selected from the group consisting of F, Cl, Br, I and H, and wherein $n$ is 2.

2. The compound $R(CHXNO_2)_y$ where R is a benzene group, $y$ is 2, and X is an ion selected from the group consisting of chlorine, fluorine, bromine, and iodine.

3. The compound $R-[C(NO_2)_2M]_y$ where R is a benzene group $y$ is 2, and M is a Group I–A or I–B metal.

4. The compound $R-[C(NO_2)_2Z]_y$ where R is a benzene group, $y$ is 2, and Z is selected from the group consisting of fluorine, chlorine, bromine, iodine, and hydrogen.

5. The compound of claim 4 where Z is fluorine.

6. The process comprising:
   a first step of reacting a nitrite salt of a Group I–A or I–B metal with bis(monohalomethyl)benzene such that a bis(mononitromethyl)benzene is formed;
   a second step of reacting said bis(mononitromethyl) compound with a compound selected from the group consisting of fluorine, chlorine, bromine, and iodine such that a bis(monohalonitromethyl) compound is found;
   a third step of reacting said bis(monohalonitromethyl) compound with a nitrite salt of Group I–A or I–B metal such that a bis(dinitromethyl) metal compound is formed; and
   a fourth step of reacting said bis(dinitromethyl) metal compound with a compound selected from the group consisting of fluorine, chlorine, bromine, iodine, and hydrogen, such that a bis(dinitromethyl) compound is formed.

References Cited

UNITED STATES PATENTS 3,459,816   8/1969   Pritchett _____ 260—645

FOREIGN PATENTS 732,634   4/1966   Canada _____ 260—646

OTHER REFERENCES

Beilsteins Handbuch Der Org. Chem., Vierte Auflage, Fumfter Band, Zwieter Teil, 1964, pp. 822 and 823.

Ungnade et al.: Tetrahedron, vol. 19, Suppl. 1, June 1963, pp. 148 to 153.

LELAND A. SEBASTIAN, Primary Examiner

U.S. Cl. X.R.

260—239, 248, 297, 347.8, 646; 149—92, 105, 109